United States Patent [19]
Miller

[11] 3,914,615
[45] Oct. 21, 1975

[54] APPARATUS FOR GAS-FOG REACTION PROCESSES

[75] Inventor: Jaydee W. Miller, Wallingford, Pa.

[73] Assignee: Sun Oil Company of Pennsylvania, Philadelphia, Pa.

[22] Filed: Apr. 26, 1973

[21] Appl. No.: 354,559

Related U.S. Application Data

[63] Continuation-in-part of Ser. No. 150,607, June 7, 1971, Pat. No. 3,717,686, and a continuation-in-part of Ser. No. 250,718, May 5, 1972, Pat. No. 3,780,130.

[52] U.S. Cl............. 250/531; 23/288 E; 23/288 R; 204/165; 204/170; 250/542; 260/683.52
[51] Int. Cl.² .................. B01K 1/00; C07C 3/54
[58] Field of Search....... 23/288 E, 288 R; 204/164, 204/165, 170; 250/531, 542, 546; 260/683.52, 683.59; 317/3; 252/359 R, 359 A

[56] References Cited
UNITED STATES PATENTS

| | | | |
|---|---|---|---|
| 3,088,987 | 5/1963 | Irvine | 260/683.52 |
| 3,135,675 | 6/1964 | Berghaus et al. | 250/531 X |
| 3,152,056 | 10/1964 | Berghaus et al. | 250/531 X |
| 3,191,077 | 6/1965 | Marks et al. | 310/5 |
| 3,544,652 | 7/1966 | VanDijk | 260/683.59 |
| 3,709,828 | 1/1973 | Marks | 204/165 X |

OTHER PUBLICATIONS
Schneider et al., "Source of Uniform-Sized Liquid Droplets," Review of Scientific Literature, Vol. 35, No. 10, pp. 1349–1350 Oct. 1964.

*Primary Examiner*—Morris O. Wolk
*Assistant Examiner*—Michael S. Marcus
*Attorney, Agent, or Firm*—George L. Church; J. Edward Hess; Barry A. Bisson

[57] ABSTRACT

Apparatus, useful in gas-fog reaction processes, comprises, in combination as a reactor system, an electrostatic fog generator, means for feeding liquid reactant or catalyst (e.g., acid) to the generator, and means for feeding a catalyst or reactant fog from said generator to a reactor vessel, means for feeding at least one vaporizable or gas phase reactant or catalyst to said reactor vessel and means for removing liquid reaction product, unreacted gas phase feed reactant and spent catalyst or liquid reactant from said vessel. The apparatus can be useful in a process for alkylation of gaseous $C_2$–$C_5$ monoolefin with gaseous $C_4$–$C_6$ branched paraffin comprising contacting the mixed gases at alkylation conditions with a fog or mist of strong mineral acid. The apparatus can contain means for injecting a vaporizable liquid reactant (e.g., isobutane) into the reactor in order to control the reaction temperature by vaporization of the reactant.

5 Claims, 5 Drawing Figures

GAS-PHASE COCURRENT ALKYLATION

PRIOR ART ALKYLATION

APPARATUS FOR GAS-FOG REACTION PROCESSES

CROSS REFERENCE TO RELATED APPLICATIONS

This application is a continuation-in-part of my applications Ser. No. 150,607, filed June 7, 1971, now U.S. Pat. No. 3,717,686 issued Feb. 20, 1973, and Ser. No. 250,718 filed May 5, 1972, now U.S. Pat. No. 3,780,130 issued Dec. 18, 1973, both said applications and the present application being assigned to the Sun Oil Company of Pennsylvania, a corporation organized under the laws of the Commonwealth of Pennsylvania.

SUMMARY OF THE INVENTION

Apparatus, useful in gas-fog reaction processes, comprises, in combination as a reactor system, an electrostatic fog generator and a reactor vessel, means for feeding liquid reactant or catalyst (e.g., acid) to the generator, and means for feeding a catalyst or reactant fog from said generator to a reactor vessel, means for feeding at least one vaporizable or gas phase reactant or catalyst to said reactor vessel whereby said reactant or catalyst vapor can contact said fog to effect a gas-fog reaction means for removing liquid reaction product, unreacted gas phase feed reactant and spent catalyst or liquid reactant from said vessel means for separating spent liquid catalyst or unreacted liquid reactant from said liquid reaction product and means for separating unreacted vapor phase reactant or spent vapor phase catalyst from said liquid reaction product. The apparatus can be useful in a process for alkylation of gaseous $C_4$–$C_6$ branched paraffin comprising contacting the mixed gases at alkylation conditions with a fog or mist of strong mineral acid. Preferably, the catalyst and reactant are maintained in a concurrent flow, and any reactant is in gas or fog phase. The apparatus can contain means for injecting a vaporizable liquid reactant (e.g., isobutane) into the reactor in order to control the reaction temperature by vaporization of the reactant. Preferably, the liquid catalyst droplets have a mean diameter in the range of 5–50 microns, typically 10–25 microns.

For example, the apparatus is useful in a process for alkylation of gaseous $C_2$–$C_5$ monoolefin with gaseous $C_4$–$C_6$ branched paraffin comprising contacting the mixed gases at alkylation conditions with a fog or mist of strong mineral acid, preferably strong (e.g., 95–105%) sulfuric acid. Such processes are disclosed in U.S. Pat. No. 3,717,686 and Ser. No. 250,718 now U.S. Pat. No. 3,780,130 issued Dec. 18, 1973. Preferably, the catalyst and hydrocarbon reactants are maintained in a cocurrent (concurrent) flow. For $C_3$ or $C_4$ acyclic monoolefin and $C_4$ and $C_5$ isoparaffin, the preferred alkylation conditions include a temperature in the range of about 30°–80°F and a pressure about atmospheric (e.g., 5–25 psia, typically 14–20 psia). The feed mole ratio, paraffin to olefin, can be in the range of 1:1 to 60:1, typically 2:1 to 30:1. Preferably, the liquid acid droplets have a mean diameter in the range of 5–50 microns, typically 10–25 microns.

Isobutane can be premixed with butylenes at the desired mole ratio and the gaseous mixture reacted in the presence of a fog of sulfuric acid droplets of about 10 microns in diameter at atmospheric pressure and 50°F. The product can contain about 30–40% isobutane and the remainder alkylate; whereas, the product from conventional liquid phase sulfuric acid alkylation contains 80–85% isobutane.

Alkylate and isobutane can be separated by distillation, the isobutane being recycled to the reactor. This distillation step is a major process cost in both the present process and in conventional alkylation. Since less (30–40% vs. 80–85%) isobutane must be removed in the present process, a substantial heat saving is realized in distillation costs.

In general, I have found that a single stage contact of a gas with a liquid in fog-phase, produced by an electrostatic fog generator, will react or interact (such as in distillation, extraction or solution processes) at nearly theoretical yield. That is, a single stage of such fog-phase contact can be considered for practical purposes as a 100% efficient theoretical plate. For example, fog-phase, single-stage, contact of liquid water (at room temperature) with gaseous sulfur dioxide produced a solution containing at least 98% of the theoretical maximum concentration of sulfur dioxide; the concept of contacting stack gas with an electrostatic fog of water, to remove sulfur dioxide therefrom, is not my invention but is prior art. Similarly, gaseous ammonia can be "scrubbed" from a mixture with less soluble gases (e.g., air, $CO_2$) by contact with a fog of water. Similarly, "steam" distillation, as with gaseous water and a fog of liquid hydrocarbons, can be effected using the apparatus and processes disclosed herein.

The terms "liquid reactant" or "liquid catalyst" refer to a reactant or catalyst which can remain in liquid phase to a substantial extent at the temperature and pressure within the reaction vessel (i.e., the reagent or catalyst has a higher boiling point than the minimum reactor temperature, at the reactor pressure). For example, where the reaction is less than 100% complete, some unreacted "liquid reactant" can usually be collected in liquid phase at the sides or bottom of the reactor vessel. In contrast, the terms "vaporizable reactant or catalyst" or "gas phase reactant or catalyst" refer to a reactant or catalyst which can be entirely vaporized within the reactor and which can be entirely removed from the reactor in vapor form.

In general, the terms "liquid reactant" and "liquid catalyst" refer to materials which are relatively higher boiling than the materials referred to as "vaporizable reactant or catalyst" or "gas phase reactant or catalyst."

Thus, the apparatus and processes of the present invention can be used to contact a liquid phase reactant (or mixture of reactants, such as isopentane and propylene) in fog phase with a gaseous phase catalyst (such as HF, $BF_3$, $H_2O$–$BF_3$, etc.). Alternatively, a liquid catalyst and one liquid reagent ($H_3PO_4.BF_3$ and isobutane) can be intermixed and contacted with a vapor phase reactant (e.g., ethylene) or mixture of gaseous reactants (e.g., ethylene and propylene).

The reacting gases, e.g., isobutane and butylene, can be pre-mixed and then reacted with a fog of sulfuric acid droplets. The droplets can be generated by electrostatic methods, for example, they can be generated by the means of producing a "charged aerosol" taught in the U.S. patents to A. M. Marks, U.S. Pat. No. 2,638,555 issued May 12, 1953 and U.S. Pat. No. 3,297,887 issued Jan. 10, 1967 or of A. M. Marks and E. Barreto, U.S. Pat. No. 3,191,077 issued June 22, 1965. The aerosol or fog need not necessarily be charged; therefore, for the present process an alternating current can be used instead of the direct current in these devices of these patents, thus generating an uncharged aerosol. The charged aerosol is preferred; however, because the droplets can be directed to a discharge device (having an opposite charge to that of the droplets, thus facilitating separation of the catalyst from the reaction mixture).

One of the advantages of this gas-fog process is that the liquid product (e.g., alkylate-isobutane mixture) can contain only about 30–40% (by volume) isobutane (e.g., the equilibrium solubility mixture at 50°F and 1 atmosphere pressure). The mixture in a conventional alkylation plant leaving the reactor is about 80–85% isobutane in alkylate due to the necessary higher pressure.

In the present process, the dilution effect of the isobutane is greater than would be anticipated. In a typical commercial $H_2SO_4$ alkylation plant, the minimum pressure in the reactor is about 25 psia and in the "front-end" of the system 40 psia is typical. In either process, feed isobutane in excess of that which can be dissolved in the product alkylate can be removed from the reactor, as a gas, and, if desired, recycled to the reactor. However, in the present process, excess gaseous isobutane can fill the reactor volume and act as a diluent; thus permitting a lower paraffin/olefin ratio in the feed to the reactor and improving product quality.

In conventional alkylation a large excess of isobutane is required in the reaction mixture to produce high octane number product in satisfactory yield. This required excess of isobutane is obtained by operating at high (50 psig) pressure to keep most of the reactor contents in the liquid phase; recycling from 5–10 volumes of isobutane per volume olefin feed; and various internal cross- and counter-flow process arrangements. The net result is that the reaction mixture typically contains 80–85 volume percent isobutane which must be separated from the product alkylate by distillation, a major process cost.

In the present process, a large excess of isobutane also is required. However, in the present process, this excess is in the gas phase. Since the product leaves the reactor as a saturated liquid, it contains only the amount of isobutane which is in vapor-liquid equilibrium at reaction temperature and (low) pressure (15–40 psia), i.e., about 30–40 volume percent. Instead of utilizing a large recycle stream of isobutane, this process provides excess residence time in the reactor, above that required for complete reaction. This excess residence time translates to a reactor volume sufficient to contain the large excess of isobutane needed for dilution. In this process, as in conventional alkylation, isobutane is separated from the reactor product by distillation. Since less isobutane must be distilled, substantial heat savings are realized at this step.

Another feature of one embodiment of the present invention is the injection of liquid paraffin, preferably $C_4$–$C_6$ (e.g., n-butane, n-pentane or isobutane) into the reaction zone to control the temperature (e.g., remove the heat of reaction by vaporization of some or all of the liquid paraffin).

BRIEF DESCRIPTION OF THE DRAWINGS

In the accompanying drawings.

FURTHER DESCRIPTION OF THE INVENTION

Figure 1:
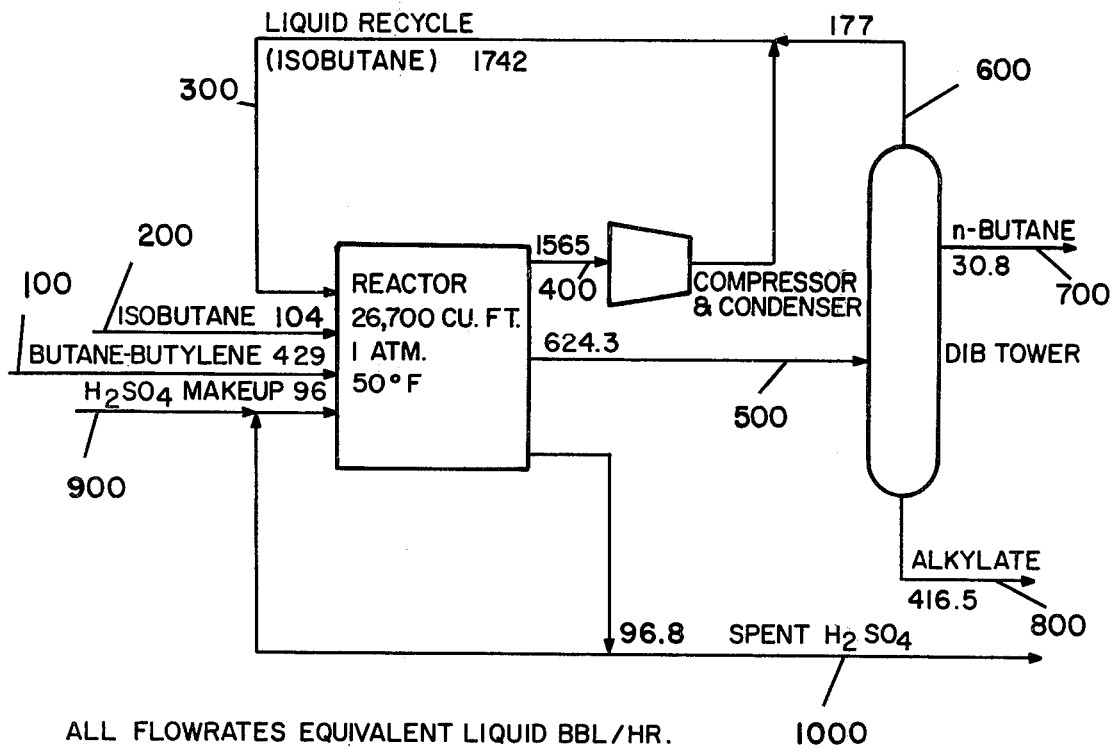
FIG. 1 is a schematic representation of an embodiment of the process of the present invention, involving cocurrent contact of a gaseous mixture of isobutane and a so-called "B—B" feed comprising butane and butylenes. The numbers are related to the illustrative examples and indicate the flow rates of the catalyst, feed materials, product, etc., each in the equivalent of liquid barrels per hour.

I have discovered that an electrostatic fog-producing device can provide nearly perfect mixing between the fog of acid catalyst and a hydrocarbonaceous gas phase feed flowing cocurrently, thus greatly improving the speed of the reaction and decreasing the necessary reactor volume needed to produce a given output of alkylate. The fog can be produced by passing a liquid through a hollow needle that is charged with about 2,000 to 8,000 volts D.C. The liquid on leaving the needle is dispersed into very small droplets. The size of the droplets depends on the voltage, but sizes of the order of 10 microns can be obtained (the limit of particle visibility in a strong light). Alkylation of monoolefin with isoparaffin is a mass transfer limiting reaction. The alkylation is thought to occur at the acid hydrocarbon interface, and to be rate controlled by hydrocarbon diffusion to the interface or into the acid. The electrostatic fogger is a useful means of conducting such an alkylation. That is, the rate of alkylation of butylenes with isobutane is believed to be limited by a process of mass transfer of hydrocarbon reactants across the hydrocarbon-acid interface into the acid phase. The electrostatic fogger produces very small particles of acid with very large specific surface area. The large specific surface area facilitates the mass transfer process which limits the reaction rate, therefore, the electrostatic fogger is a particularly useful means of conducting such an alkylation.

A gas-fog phase alkylation reactor, including an electrostatic fogging means can be used to produce gasoline boiling range alkylate from isobutane-isobutylene gas mixtures and sulfuric acid dispersed as a fine mist or fog. The acid is dispersed into a fog with a direct current high voltage charge. Acid fog can be continuously produced and the reactant gases flowed cocurrently with the fog. Mixture ratios of isobutane to isobutylene can be varied, for example, from 2:1 to 30:1. The temperature of reaction can typically be from 30°F to 80°F. The pressure is preferably atmospheric, although higher or lower pressures can be used.

Alkylate quality (e.g., maximum percent $C_5$–$C_8$ and minimum percent $C_9$+) can be comparable to conventionally produced alkylate using the same reactant gases. Preferred reaction conditions for producing alkylate of a similar type (but typically superior in octane rating) to commercial alkylate (as illustrated by Examples I and II herein) comprise an isobutane/olefin ratio of about 10–20:1; temperature of about 30°–35°F and pressure of about 1 atmosphere. If isobutylene were the olefin in a conventional sulfuric acid alkylation process, the product alkylate would contain about 35% $C_9+$; alkylate produced by the present process from isobutylene can contain about 30% $C_9+$.

It is generally believed by those skilled in the alkylation art that an isobutylene feed provides the most severe test of an alkylation process. If a process produces high quality alkylate on this feed, as my process does, it will perform even better on other olefin feeds.

It is well known that isobutylene is the poorest of the three $C_4$ olefins as an alkylation feed. This is because reported alkylate quality (maximum percent $C_5$–$C_8$ and minimum percent $C_9+$) is lowest. Therefore, isobutylene is not used alone as a commercial alkylation plant feed. However, the art does give results of commercial operation on isobutylene feed, and when these results are compared with my results using the present process in illustrative Examples I and II, it is seen that the product of the present process is superior in quality. Illustrative Example III is a process design based on Examples I and II, and shows the source of the cost saving when using the present process.

Cost savings on the de-isobutanizer distillation column can be realized because of gas phase operation. The calculated savings are about 10 cent per barrel of alkylate. These savings are realized in decreased steam requirements on the DIB (i.e., deisobutanizer) tower. That is, Example III shows that the heat saving in the distillation step amounts to about 142 pounds steam per barrel alkylate. This saving is offset slightly, yielding a net cost saving (at 80 cent per M pounds steam) of 10 cent (barrel alkylate) or $300,000 per year for a plant of 10,000 B/D capacity. This savings of about 10 cent per barrel is a significant decrease and indicates that the economics of the present process are at least as attractive as those of the more modern hydrofluoric acid plants. Another advantage is that the present process can utilize a less expensive (although somewhat larger in volume) reactor vessel than is required in conventional liquid phase reaction. That is, since the present process can be run at atmospheric pressure, expensive pressure reactors and associated equipment are not required. Furthermore, the conventional alkylation requires expensive homogenization mixers to insure good liquid-liquid contacting. The present process can be run using a potentially less expensive mixing system (e.g., the electrostatic fog generator).

ILLUSTRATIVE EXAMPLES

EXAMPLE I

Figure 5:
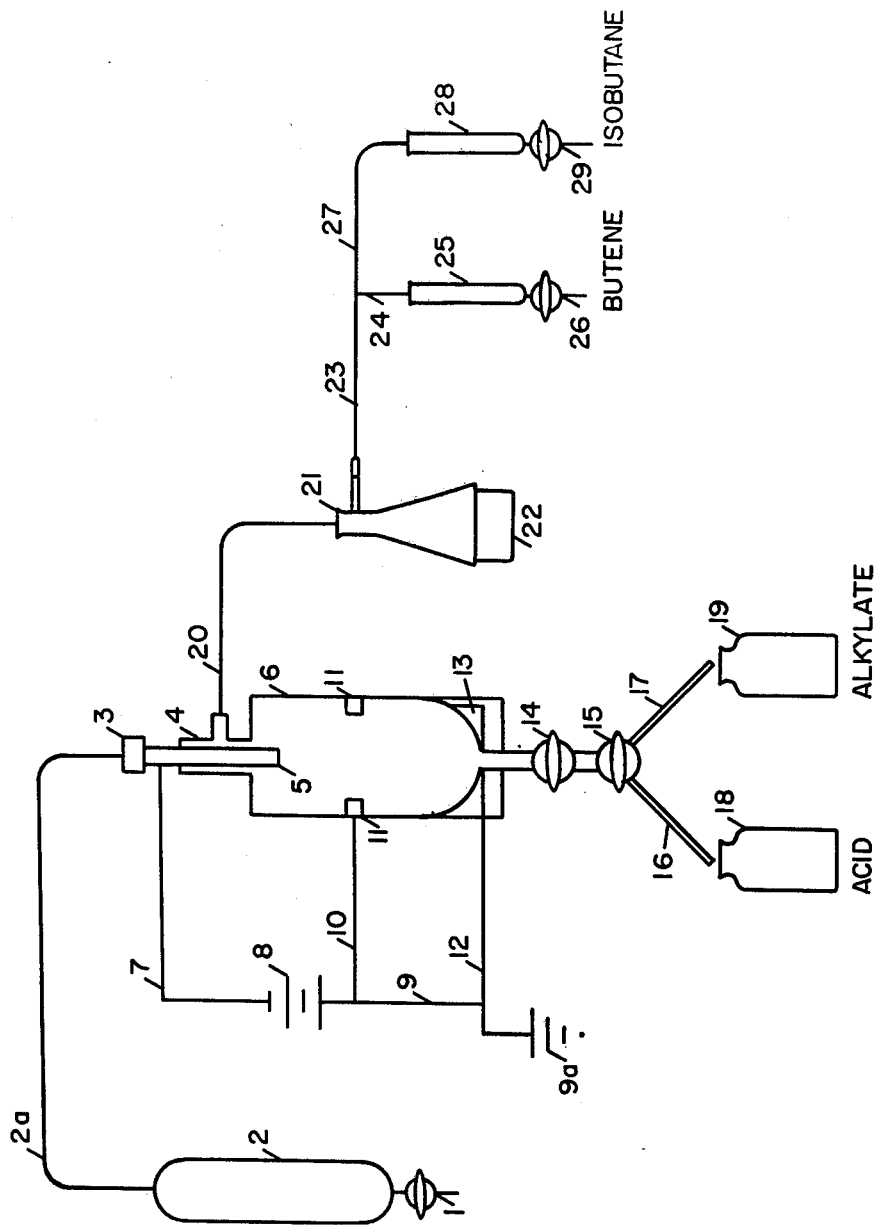
FIG. 5 is a schematic illustration of apparatus referred to in the illustrative examples.

A reactor system similar to that of FIG. 5 was set up, including an electrostatic fog generator. The reactor system comprised means 1, 2, 2a, 3 for feeding liquid acid to the electrostatic fog generation means 7, 8, 9, 9a, 10, 11, 12, 13, means 20, 21, 22, 23, 24, 25, 26, 27, 28, 29 for mixing and feeding olefin and paraffin to the reactor means 4, 5, 6 and means 14, 15, 16, 17, 18, 19 for venting unreacted gases and for collecting the alkylate product and the spent acid.

The "means" illustrated in FIG. 5 can be the following:

| | |
|---|---|
| (1) | Stopcock and drain |
| (2) | Sulfuric acid reservoir |
| (3a) | Transfer line |
| (3) | Connector |
| (4) | Hydrocarbon feed port |
| (5) | Inlet acid tube and needle |
| (6) | Reaction vessel |
| (7) | High voltage electrical lead |
| (8) | High voltage source |
| (9) | Electrical ground connections; (9a),(10),(12),(13) |
| (11) | Collector ring |
| (14) | Stopcocks and transfer lines (product) (15) |
| (16) | Acid collection line |
| (17) | Alkylate collection line |
| (18) | Acid collection reservoir |
| (19) | Alkylate collection line |
| (27) | Hydrocarbon gas feed line (24),(23),(20) |
| (21) | Hydrocarbon gas mixing vessel |
| (22) | Mixer motor |
| (25) | Reactant butylene reservoir |
| (28) | Reactant isobutane reservoir |
| (26) | Stopcock and drain (29) |

All parts were of teflon and the walls of glass. The exciter ring 11 and discharge ring 13 of the fog generator were of 316 stainless steel. The inlet acid tube and needle 5 were of 316 stainless. The effective reactor volume (i.e., free space) was 100 cc. The acid reservoir 2 was a 500 cc stainless Hoke bomb. All external tubing was stainless.

Sulfuric acid was reagent grade (98% minimum); isobutylene was CP grade from Matheson Chemical Company. Isobutane was a technical grade Sun Oil Company refinery product (about 95% pure).

This reactor did not include means for cooling the reacting volume. The purpose of this reactor and the testing done therewith was to establish that the present process was operable. This testing was not intended as a means of process optimization (as was done to some degree in later work reported herein).

During operation of the reactor, liquid hydrocarbon product was qualitatively analyzed using a vapor phase chromatograph (VPC). The column had a simple boiling point separation packing. The product VPC scan could be compared with a scan of commercial alkylate from a "B-B stream," and thus indicate whether product was similar to the plant alkylate. A comprehensive analysis was made of the compounds in a sample of the product.

Before any reactant gases were admitted, the system was thoroughly purged with nitrogen. After about 30 minutes of purging with nitrogen, the acid flow was started at the desired rate. Isobutane was introduced and the power supply was turned on and set at the desired level (about 4,000–6,000 volts) and below the level where arcing would occur. The system was allowed to operate for a few minutes to come to steady stage operation. The atomization was observed to insure that the acid was atomized correctly. When correct atomization was achieved, the acid drops were so fine that they were invisible. When correct atomization was reached, the isobutane rate was readjusted and set at the desired level, then the isobutylene was turned on at the desired level. In the gas liquid separator at the bottom of the reactor, unreacted gases were vented off and the liquid product was collected at the bottom.

During the runs, the acid layer was periodically drawn off through a stopcock at the bottom. When necessary, the organic layer could also be drawn off. A run usually lasted about 10–20 minutes. On approaching the end of the run period, the stopcock would be left open for a while to drain out all material. The organic material was immediately sampled and assayed on the VPC.

If the scan looked promising, the sample was retained for comprehensive analysis. If poor, the sample was discarded. In general, product volumes were of the order of 0.2 cc.

After closing the sample stopcock, voltage, reactant gases and acid were turned off. About 30 minutes would elapse between tests to allow the reactor to drain all liquids. In some runs the acid would coat the glass walls of the reactor. When this occurred, the reactor was disassembled and cleaned in order that acid coating the walls would not alter the reaction conditions, and thus not provide a reaction representative of gas-fog phase conditions. During the draining periods nitrogen was used to purge the system. Then the run procedure was repeated with a new set of reaction conditions.

A total of 35 scouting runs were made. These runs were designed to prove operability of the process and to indicate operating conditions for production of high quality alkylate. A high quality alkylate was defined as a material that had a VPC scan of the commercial alkylate. By this procedure, it was found that the mixture ratio of alkane to olefin was the main variable in determining the quality of the alkylate. This ratio for good results was in the range of 8:1 to 30:1 and for best results was about 10–20 moles paraffin (isobutane) to 1 mole olefin (isobutylene). Since the other $C_4$ monoolefins are known to be less likely to polymerize than isobutane, with most catalysts, it is very likely that lower ratios (e.g., 3:1–8:1) will produce useful alkylate with a B—B stream.

Other variables that affected quality, but to a much lesser degree, were acid rate and temperature of incoming gases. In general, acid rates of 0.03–0.3 cc per minute were used and quality was somewhat constant for these values. At the higher acid rates (0.3 cc per minute), the walls of the reactor would become coated with acid and most of the reaction would occur on the walls and quality would go down. When incoming gases were cooled to 32°F, an increase in quality was observed. This demonstrated the importance of cooling.

Voltage on the needle (the acid entrance) had no effect on quality except at higher voltages (4,000–5,000) where arcing could occur and temporarily change the atomization. Current was usually about 10–70 microamps.

Typical examples of both successful and unsuccessful runs are given in Table I of my application Ser. No. 250,718. These runs establish feasibility of the process in at least this range of conditions:

| | | |
|---|---|---|
| $iC_4/C_4=$ | 8:1 to 30:1 | mol ratio |
| acid rate | 0.03 to 0.3 | cc per minute |
| voltage | 4000 to 6000 volts | at 10–70 microamp |

Although some unsuccessful runs also occurred in this range of conditions, feasibility was established and a more refined study conducted as described in Example II.

EXAMPLE II

A larger reactor was constructed, similar to that of Example I, except that the reactor had another tube inside the acid tube to permit controlled addition of liquid isobutane. As the butane vaporized, it extracted the heat of reaction, thus controlling the reaction temperature. In this reactor, the temperature of reaction zone could be controlled with liquid isobutane. Using this cooled reactor, a series of 15 tests was run. Some of the tests were aborted because of shorting from the needle to ground, but the product from the remaining tests was similar to product from commercial prior art sulfuric acid, liquid phase, alkylation using the same feedstocks. Table II of my application Ser. No. 250,718 summarizes the tests from this reactor.

As shown by this example, one embodiment of the invention involves an apparatus for gas-fog reactions and containing means for injecting a vaporizable liquid into a reactor and means for controlling the rate of injection in order to maintain a desired temperature in the vessel. This is illustrated, for example, in FIG. 1 of the drawings where a liquid recycle of isobutane 300 is fed into the reactor maintained at 50°F and 1 atmosphere. In FIG. 1, the compressor and condenser 400 illustrates a well-known means of cooling a vapor, such as the isobutane.

Table III of my application Ser. No. 250,718 provides a comparison of the composition, by gas chromatographic analysis of alkylate produced in this scouting reactor with published analysis of an alkylate produced commercially with isobutylene feed. The data therein show that the product of the present process can be at least equal in quality to the commercial alkylate. Yield based on isobutylene consumed was only about 50–70% of theoretical, but there is every indication from these results that theoretical yields can be obtained with the process and apparatus of the present invention.

EXAMPLE III

Figure 2:
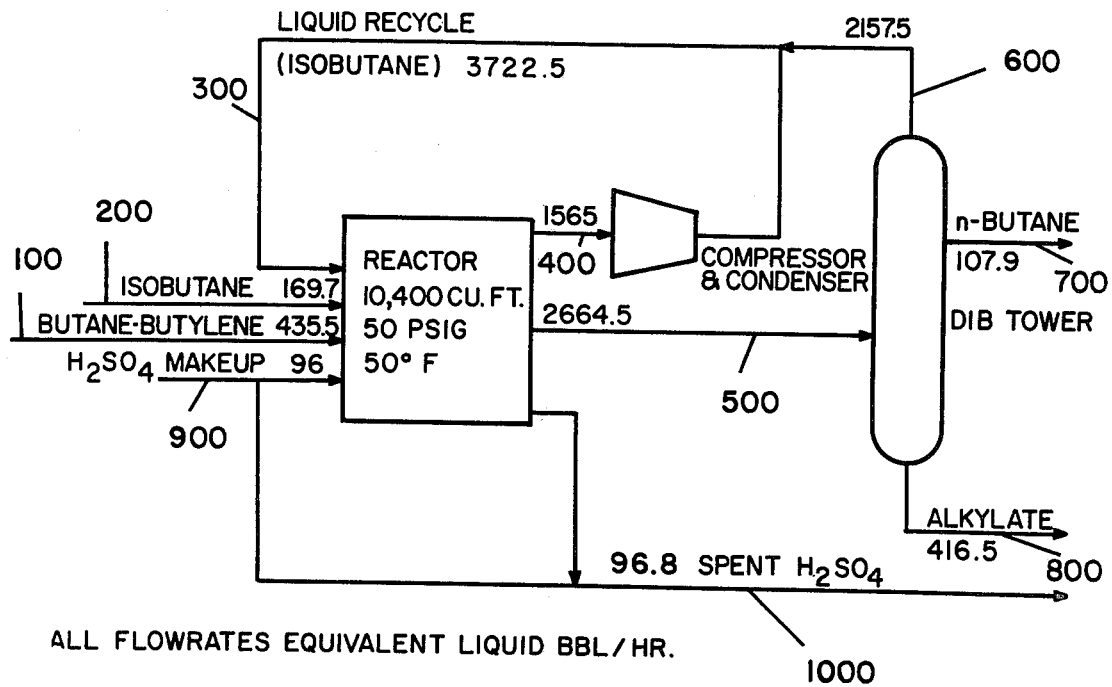
FIG. 2 is a schematic illustration of a typical prior art liquid phase commercial sulfuric acid alkylation process capable of producing the same output of alkylate as the process embodiment of the present invention illustrated in FIG. 1. As is discussed, supra, in the illustrative examples, (see material and heat balances, Tables IV and V) these drawings aid in comprising the advantages of the present process with that of the prior art.
Figure 3:
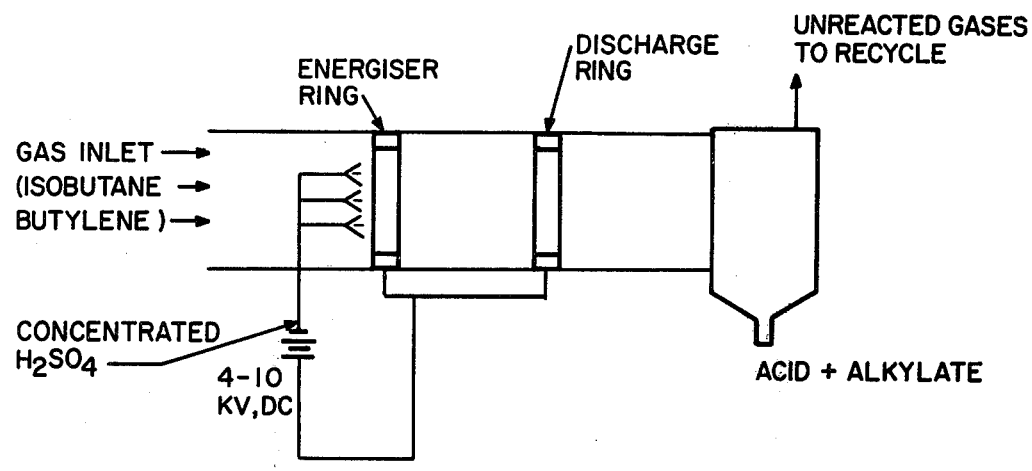
FIGS. 3 and 4 are schematic illustrations of two types of reactor systems including electrostatic fog-producing means, which can be used in the process illustrated in FIG. 1.
Figure 4:
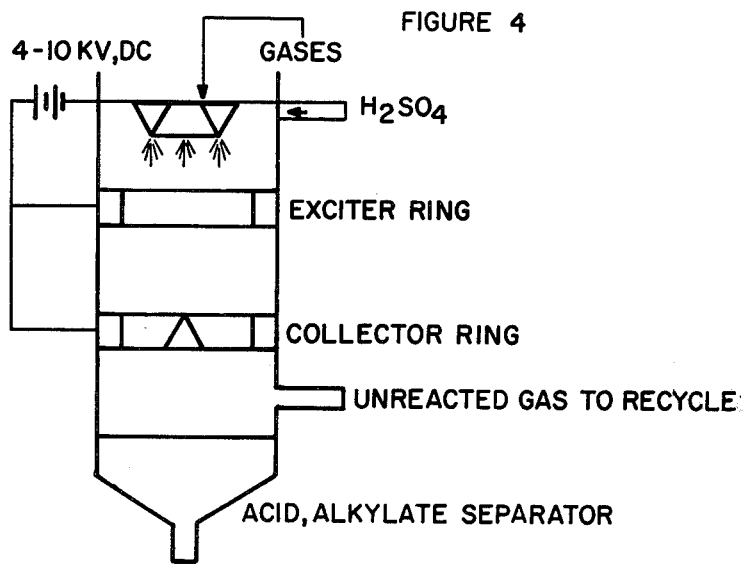

In the accompanying drawings, FIG. 1 is a flow sheet of the embodiment of the present process and FIG. 2 illustrates, for comparison, conventional liquid phase $H_2SO_4$ alkylation. In both figures streams are numbered for comparison. The identification numbers also are found in the column headings of Table IV of Ser. No. 250,718 which shows a material balance of each such process. Table V of Ser. No. 250,718 shows a heat balance around the DIB tower in each such process and shows the decreased heat load which is obtained with the process of the present invention. These calculations show that the gas-fog phase alkylation of the present invention can save about 10 cent per barrel of product due to decreased steam consumption to the DIB tower.

A minor amount of "red oil" or "spent" acid (from conventional sulfuric acid alkylation or from a previous run of the present process or from a sulfonation, sulfation or acid extraction process) can be added to the $H_2SO_4$ catalyst to aid in "promoting" and/or "starting" the alkylation process (e.g., 10 parts used acid added to 300 parts (by volume) of fresh acid. "Red oil" from sulfuric acid alkylation apparently comprises sulfated olefinic compounds (and thus is analogous to "turkey red oil" which comprises sulfated oleic acid and which can also be used as a promoter in the present process). Spent alkylation acid can contain dissolved red oil or the red oil can be separately recovered.

Other analogous "red oils" or sulfated or sulfonated oils (such as "mahogany acids") can also be used as promoters or starters.

Reactor pressures below atmospheric can be useful in vaporizing higher boiling feed components (e.g., $C_5$–$C_6$ branched paraffins) or the liquid paraffin coolant.

In the process of the present invention it is preferred that the olefin and isoparaffin reactants be in vapor phase; however, in the process mixed phase conditions can be used (i.e., where one or more of the reactants is partially in liquid phase). When such mixed phase conditions are used it is preferred during the acid contact step that the liquid portion of the reactant be as finely divided as is practical (e.g., fog phase). A solution or a mixture of a gas and a liquid (e.g., isobutene gas and sulfuric acid liquid) can comprise the feed to the fog generator.

The invention claimed is:

1. Apparatus, useful in gas-fog reaction processes, comprising, in combination as a reactor system, a reactor vessel and electrostatic fog generator means which are located within said vessel, electrostatic fog generator means producing a charged aerosol fog and comprising collector means which collector means include means for discharging the charge after the reaction has occurred, means for feeding a liquid catalyst to said electrostatic generator means, means for feeding a catalyst fog produced by said electrostatic generator to said reactor vessel, means for feeding vapor phase and liquid reactants to said reactor vessel whereby said reactants can contact said fog to effect a gas-fog reaction, means for removing liquid reaction product formed by said reaction, unreacted reactant or catalyst from said vessel, means for separating spent liquid catalyst or unreacted liquid reactant from said liquid reaction product and means for separating unreacted vapor phase reactant from said liquid reaction product.

2. Apparatus according to claim 1 wherein said apparatus also contains means for receiving reactants for mixing, means for mixing a plurality of reactants and means connecting said mixing means to said reactant feed means for feeding said mixture to said reactor vessel.

3. Apparatus according to claim 1 wherein said means for separating unreacted liquid reactant from said liquid reaction product include distillation means.

4. Apparatus according to claim 1 wherein said means for separation of spent liquid catalyst or unreacted liquid reactant from said liquid reaction product include means for separation of two immiscible liquids.

5. Apparatus according to claim 1 and containing means for adding a reaction promoter to said catalyst.

* * * * *